Aug. 14, 1945.  F. E. WOLCOTT  2,382,594

COFFEE MAKER AND FILTER THEREFOR

Filed July 18, 1942

INVENTOR.
FRANK E. WOLCOTT.
BY
Louis V. Lucia
ATTORNEY.

Patented Aug. 14, 1945

2,382,594

UNITED STATES PATENT OFFICE 2,382,594

COFFEE MAKER AND FILTER THEREFOR

Frank E. Wolcott, West Hartford, Conn., assignor to The Silex Company, Hartford, Conn.

Application July 18, 1942, Serial No. 451,430

9 Claims. (Cl. 210—162)

This invention relates to coffee makers and particularly to those which include a lower bowl having an upper bowl mounted thereon as a coffee container.

The primary object of the invention is to provide, for such coffee makers, a novel filter which is highly efficient in its operation as well as simple in construction and inexpensive to manufacture.

A further object is to provide such a filter having novel structure for supporting a strainer member in such a manner as to permit maximum efficiency in the filtering of coffee.

A still further object is to provide a coffee maker construction which is particularly adapted for such a filter and which has an upper bowl, or coffee container, which functions as an external coffee basket and thereby permits maximum capacity for coffee grounds in proportion to the size of said container.

It is well known that, particularly in coffee makers of the drip or percolator type, the upper bowl is usually provided with an inner coffee basket. This requires a larger upper bowl, or container, in order that it may contain the coffee basket. My invention eliminates the need of a separate coffee basket and permits the bowl or upper container itself to function as an external coffee basket.

Further objects of my invention will be more clearly understood from the following description and from the accompanying drawing in which.

Figure 1:
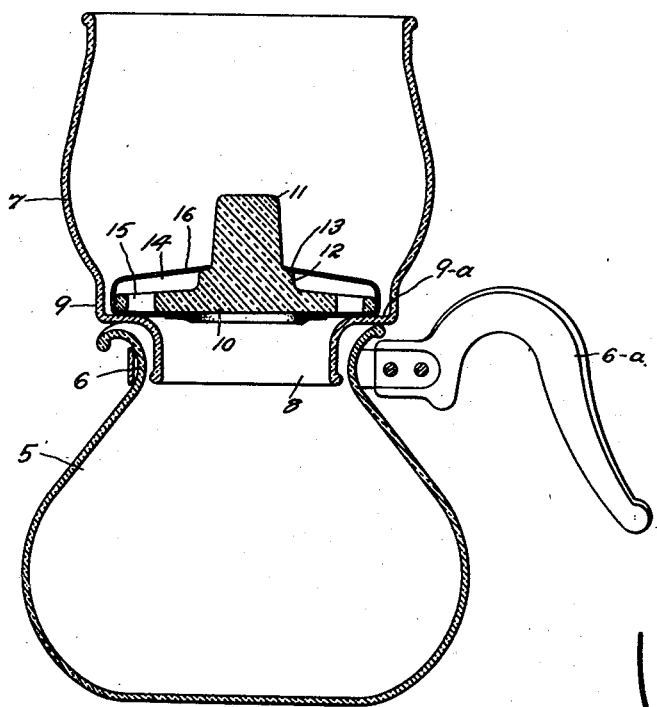
Fig. 1 is a view in central vertical section of a coffee maker and filter embodying my invention.
Figure 2:
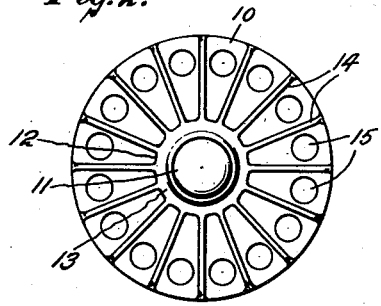
Fig. 2 is a plan view of the drainer member of said filter.
Figure 3:
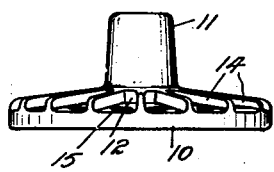
Fig. 3 is a side view thereof in elevation.
Figure 4:
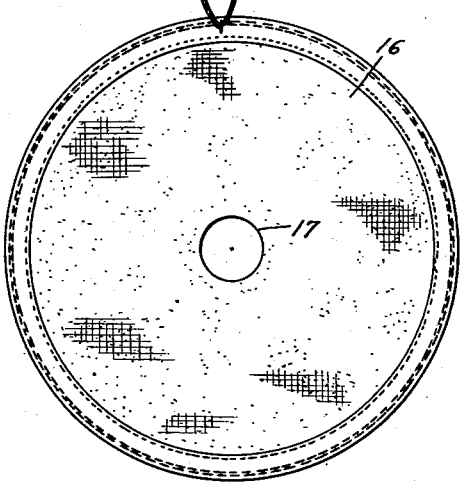
Fig. 4 is a plan view of a strainer member in extended position.

As illustrated in the drawing, the numeral 5 denotes the lower bowl of a coffee maker having the usual neck portion 6 and handle 6—a.

My improved construction provides an upper bowl 7 having an open bottom portion 8 and a surrounding projection 9 extending outwardly from the wall thereof to provide a surrounding shoulder whereby the said upper bowl is supported upon the top of the lower bowl. The said shoulder also provides an inner ledge 9—a which surrounds the opening in the bottom portion 8 and serves as a seat for supporting the filter member.

My improved filter member comprises a drainer plate 10 having an upstanding boss 11 thereon which provides a handle for lifting the filter. The said boss has an enlarged portion 12 which forms a shoulder 13 and the plate 10 is provided with a plurality of strainer supporting ribs 14 which are disposed laterally thereon and extend from the portion 12 to the peripheral edge of said plate with the tops of said ribs disposed on a plane sloping downwardly from the shoulder 13. The plate 10 is also provided with a plurality of apertures 15 which are spaced from the peripheral edge of the plate and extend therethrough between said ribs.

A strainer 16, preferably in the form of a disk of pervious material, has a central opening 17 to receive the boss 11 of the drainer plate and is provided with a surrounding drawstring 18 or other suitable means for drawing the marginal edges of said disk around the drainer plate.

The said strainer is mounted upon the drainer plate 12 by inserting the boss 11 through the opening 17 and drawing the edges of the disk inwardly, by means of the string 18, to retain the said strainer over the drainer plate in the position illustrated in Fig. 1 wherein the said strainer is supported upon the upper edges of the ribs 14 and the marginal portion surrounding the opening 17 overlies the shoulder 13 so as to prevent the passage of coffee grounds around the edge of said opening. Further, the said opening 17 is made considerably smaller than the boss 11, which is tapered, so that the strainer will fit tightly around the said boss to prevent the passage of coffee grounds.

When my improved filter is assembled as illustrated in Fig. 1, each of the spaces between the ribs 14 provides a supported separate filtering area in the strainer which extends over a separate chamber having one of the openings 15 through the bottom thereof so that coffee will filter through the strainer member, into the crevices between the ribs, and through the openings 15 in the bottom of each crevice, into the lower bowl. The coffee may also filter around the peripheral edge of the plate and under the same between the bottom of the filter plate and the filter supporting ledge above described.

My improved filter has been found to be highly efficient in its operation for the reasons that it permits a maximum filtering area and that, due to the ribs 14 being thin in cross section, a suitable support is provided for the strainer disk with a minimum of obstruction to the filtering of the coffee therethrough.

It is particularly pointed out that my invention provides, for coffee makers, a novel filter having a drainer plate which is adapted to support a strainer member thereon in a position wherein it is spaced from and above the said drainer plate to permit the passage of liquid through said drainer over substantially the entire area of the drainer plate and thereby provide maximum efficiency in filtering.

Further, it will be noted that my invention provides a filter which is highly efficient in the brewing of coffee by the "drip" method, since it affords a relatively large drainer plate which provides maximum filtering area and has a strainer sheet of pervious material thereover that regulates the return of the water from the upper to the lower bowl and allows the necessary time for correct infusion.

I claim:

1. In a filter for coffee makers, the combination of a drainer plate having apertures extending therethrough, a plurality of ribs extending upwardly from the surface of said plate and located between said apertures, and a strainer member supported above and spaced from said apertures by said ribs and extending downwardly over the peripheral edge of and under said drainer plate.

2. For a coffee maker of the character described, a drainer including a plate having a plurality of holes therethrough, a central upstanding portion forming a handle therefor, an annular shoulder surrounding said portion, and a plurality of raised ribs extending radially from said shoulder to the edge of said plate and located between said openings.

3. For a coffee maker of the character described, a drainer comprising a plate having a plurality of openings therethrough and an outwardly sloping upper surface, a central tapered projection forming a handle for said plate, an annular shoulder surrounding said projection, a plurality of ribs extending from said shoulder and located between said openings, and a strainer member having a central opening adapted to be stretched over said handle; said strainer member resting upon said ribs and extending over the edge of said plate and under the same, and means for drawing the marginal portions of said strainer member inwardly under said plate.

4. A filter comprising a drainer plate having a central boss with a surrounding shoulder, a draining surface sloping downwardly from said boss to the edge of said plate, a plurality of raised ribs on said surface extending radially from said boss, a strainer member mounted over said plate and supported upon the tops of said ribs over the entire length thereof with portions of said strainer overlapping the top of said shoulder, and openings in said drainer plate on a plane below the tops of said ribs.

5. A filter comprising a drainer member comprising a plate having a central boss extending upwardly therefrom, a draining surface sloping downwardly from said boss; the said boss having an enlarged portion forming a surrounding shoulder, a plurality of ribs extending radially from said boss to the edge of said plate, apertures extending through said plate on a plane below the tops of said ribs, and a strainer member resting upon the tops of said ribs and overlapping said shoulder.

6. For a coffee maker filter of the character described, a drainer plate having an outwardly and downwardly sloping upper surface, a central boss on said surface, a plurality of holes through said plate, and a plurality of raised ribs extending radially on said surface and each located between said holes; each of said holes extending substantially across the space between said ribs to permit liquid gathered therein to drain through said plate.

7. For a coffee maker filter of the character described, a drainer plate comprising a disk-shaped portion having an outwardly and downwardly sloping upper surface with openings extending therethrough, a central boss providing a raised shoulder on said surface, and a plurality of raised ribs extending radially from said boss and having strainer supporting top surfaces extending from the plane of said shoulder to the edge of said plate.

8. For a coffee maker filter of the character described, a drainer plate comprising a perforated disk-shaped portion having a central upstanding boss with a reduced vertical extension thereon providing a handle portion and an annular shoulder surrounding said boss, and a plurality of vertical ribs on said surface extending radially from said boss with the top edges thereof extending from the plane of said shoulder.

9. For a coffee maker filter of the character described, a drainer plate comprising a disk-shaped portion having a central boss providing a raised shoulder, an upper surface sloping downwardly from said boss to the edge of said plate, and raised ribs extending radially from said boss to the edge of said plate and having their top edges sloping downwardly from the plane of said shoulder, and an opening in said plate extending substantially across each space between the said ribs for draining liquid therethrough.

FRANK E. WOLCOTT.